United States Patent Office 3,024,275
Patented Mar. 6, 1962

3,024,275
SYNTHESIS OF UNSATURATED
CARBOXYLIC ACIDS
Wayne A. McRae, Lexington, and John L. Eisenmann, Braintree, Mass., assignors, by mesne assignments, to Diamond Alkali Company, Cleveland, Ohio, a corporation of Delaware
No Drawing. Filed June 17, 1959, Ser. No. 820,852
3 Claims. (Cl. 260—526)

This invention relates to a preparation of alpha-beta unsaturated carboxylic or olefinic acids and, in particular, to the synthesis of acrylic and crotonic acids and their higher aliphatic analogs by means of a reaction between organic epoxy compounds and carbon monoxide utilizing as catalyst a metal carbonyl, preferably cobalt carbonyl.

It is the primary object of this invention to produce crotonic acid by means which will be commercially applicable and which will constitute a substantial improvement over the prior art. Efficient preparation of crotonic acid is a highly desirable object since this compound is an important component in copolymerizations as well as finding a high degree of utility as a chemical intermediate and as a starting material in the preparation of plasticizers and protective coatings.

Another object of the invention is to provide a general and efficient method for preparing alpha-beta unsaturated carboxylic acids for use primarily in processes associated with the plastics industry.

Other objects of the invention will appear as the specification proceeds.

The prior art with respect to the synthesis of alpha-beta unsaturated carboxylic acids contains many examples of various approaches toward this synthesis. One synthesis which has proved to be competent in its adaption to commercial processes is that whereby acetylene, nickel carbonyl and aqueous hydrochloric acid are reacted together at 45° to 50° C. to produce acrylic acid. A procedure which is a variant of this synthesis combines a nickel halide catalyst in a mixture of water and ethanol with carbon monoxide and acetylene at 150° to 180° C. under a pressure of about 30 atmospheres. These procedures necessitated the handling of poisonous and explosive materials and are less economical than the present procedure.

A method of considerable interest in its pertinence to the disclosures of the present invention is that described in U.S. Patent 2,782,226 wherein a process is claimed whereby ethylene oxide, carbon monoxide and water in the presence of a cobalt carbonyl catalyst are reacted at superatmospheric pressures and at temperatures of the order of 100° C. and below to produce monoethylene glycol hydracrylate which can subsequently be dehydrated and hydrolyzed to acrylic acid. The method toward obtaining acrylic acid from this process is possible only through the steps of dehydration and hydrolysis, thereby greatly restricting the efficiency of this method when considered under commercial economics.

The present invention is based upon the discovery that if sufficiently high pressures of at least 2,000 lbs. per sq. inch and temperatures in excess of about 120° C. are employed for the reaction between an organic epoxide and carbon monoxide in the presence of a metal carbonyl catalyst such as dicobalt octacarbonyl, an olefinic acid consisting of one more cabon atom than the initial epoxy compound is produced in considerable yields. This reaction is most suited for the preparation of aliphatic olefinic acids, however, various epoxy compounds containing substitution groups such as aromatic groups can be reacted to obtain the corresponding unsaturated carboxylic acid. A most important advantage attached to the process of the present invention is that olefinic acids can be produced in substantial yields through a one-step process necessitating no intermediate dehydration or hydrolysis steps. The processes of this invention are highly adaptable toward commercial large-scale production of olefinic acids.

It has not been proven that one exact mechanism is fitted to all processes of this invention and there is no thought that this invention will be limited in any way by a discussion of the most probable mechanism applicable to it, but in order to illustrate what constitutes the bases of our reactions, the following mechanism is preferred:

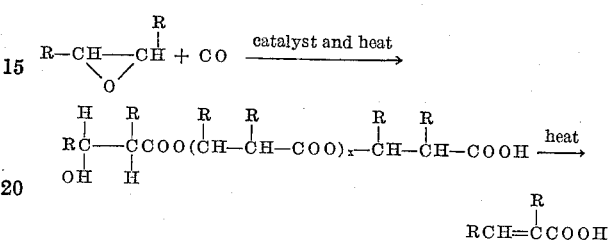

where R is an aliphatic, alicyclic or aryl radical or hydrogen. The present invention also contemplates the use of compounds with more than one epoxy group.

The mechanism proposes that the epoxy compound is first converted into a polyester by reaction with carbon monoxide under the influence of heat, which, polymer is pyrolyzed into the corresponding olefinic acid. A salient feature of the reaction is the phenomenon of a hydrogen atom being transferred from a carbon atom to the eventual carboxylic group.

The mechanism of this type of pyrolysis reaction is known in the conversion of polyhydracrylic acid to acrylic acid, for example, wherein the polymer is converted to acrylic acid by means of pyrolysis at 150° C.

In the processes of this invention, it has been found that at pressures between 1,000 and 10,000 lbs. per square inch and temperatures between 120° and 250° C., a metal carbonyl catalyst will influence a reaction between carbon monoxide and various epoxy compounds producing unsaturated carboxylic acids. The epoxy compound chosen as starting material is preferably aliphatic and monofunctional in character, for example, 1,2-epoxypropane, 1,2-epoxyethane, 3,4-epoxypentane. However, alicyclic compounds such as cyclohexene epoxide, etc., are also effective. Simple aromatic epoxy compounds such as 1,2-epoxy-1-phenyl-ethane (styrene oxide) may also be used, however, as the epoxy compound becomes more complicated, so does the incidence of undesirable side reactions increase and the yield of desired product decrease.

It is desirable that the carbon monoxide used be relatively free from contaminating gases such as water, hydrogen, or ammonia, which may influence the occurrence of undesirable side reactions, although in some reactions involving highly reactive epoxides, carbon monoxide at a relatively low purity was employed with good results. High molar ratios of carbon monoxide to epoxy compound are generally conducive toward high yields of product although extreme excesses merely lower the economic efficiency of the process. A molar ratio of carbon monoxide to epoxy compound up to about 40:1 is generally satisfactory.

The reaction will not take place without the presence of a soluble metal carbonyl catalyst, such a catalyst even in minute amounts exerts a profound effect upon the reaction. These catalysts may be carbonyls of any metal that is capable of forming carbonyls, such metals are ordinarily grouped under the category of "hydrogenation catalysts." This type of catalyst generally serves to provide reactions involving the hydrogenation of compounds by means of hydrogen gas or nascent hydrogen.

Metals representative of this group are iron, cobalt, nickel, chromium and manganese. For each carbonyl catalyst formed from members of this group there exists a certain range of pressures and temperatures which will produce the desired product in maximum yield, a yield which will vary from catalyst to catalyst. It may be that the yields from application of certain catalysts to certain reactions will be negligible. It has been found that the cobalt carbonyls, in general, function as, by far, the best catalytic agents of the group. Therefore, for almost all reactions possible under the processes of this invention, the catalyst dicobalt octacarbonyl has been found to be the most efficient catalyzing agent, producing high yields with relatively low concentrations. The order of effectiveness of these catalysts is Co>Ni>Fe>Mn>Cr.

It has been found that a more efficient and productive reaction usually takes place when the catalyst is introduced into the reaction mixture as a soluble carbonyl of the particular metal chosen as the catalytic agent. Of the catalytic metal carbonyls available, that which exerts the greatest influence on the reactions concerned is dicobalt octacarbonyl $(Co(CO)_4)_2$ which in the great majority of the reactions made possible by means of the processes of the present invention surpasses in a high degree, as measured by comparative yields of desired products, the effectiveness of other potential catalysts. This catalyst is prepared by heating cobalt carbonate with 1:1 carbon monoxide-hydrogen mixture using an inert solvent and pressurizing the system to about 5,000 lbs. per square inch with a temperature of about 160° C. The reaction requires approximately two hours. This compound is recovered in the form of orange-red crystals and is readily soluble in organic solvents. It should be stored as solution in an inert solvent such as petroleum ether under refrigeration.

It has been found that concentrations of the dicobalt octacarbonyl catalyst as low as 0.001 mole percent based on the weight of the epoxy compound function well catalytically; however, a practical range was found to be from about 0.2 to about 6.0 mole percent, the effect of the catalyst tending to increase in direct ratio to its concentration until a certain optimum level is reached.

The temperature range for the reactions constituting the processes of this invention lies between about 120° C. and about 250° C. The temperature chosen for a particular reaction is governed in part by the stability of the carbonyl catalyst selected for the reaction which tends to decrease rapidly with an increase in temperature. The stability is dependent upon the combined effect of temperature and pressure, the higher the temperature employed, the higher the pressure required to keep the carbonyls from decomposing; for example, dicobalt octacarbonyl requires a pressure of about 600 lbs. per square inch if a temperature of 150° C. is maintained. Since temperatures in excess of 200° C. may often be necessary in order to obtain high yields of the product, a correspondingly high pressure may also be necessary. It has been found that a range of pressures from 1,000 to 10,000 lbs. per square inch is ordinarily adequate and a working range of 3,000 to 8,000 lbs. per square inch suitable for most of the reactions possible under the processes of this invention. Although for each reaction there is an optimum condition of temperature and pressure, it is usually the case that yields increase with an increase in temperature and pressure, however, care must be taken that the temperature of a reaction does not exceed the decomposition point of either the epoxy compound or the olefinic acid product desired. By increasing the time of a reaction and employing an efficient catalyst, lower temperatures and pressures may be used, thus lessening the risk of incurring undesirable side reactions or decompositions. On the other hand, prolonging the time of a reaction wherein the pressure and temperature used are relatively high may cause undersired secondary reactions, such as condensations. Usually a duration of from one to 18 hours for a reaction is normally sufficient for good yields.

In the general preferred method of practising this invention, the epoxy compound and the carbonyl catalyst are dissolved in an inert solvent such as petroleum ether or benzene and the solution placed in a pressure-resistant vessel, which is flushed with nitrogen and then charged with carbon monoxide to the desired pressure. Agitation is applied consisting of either a rocking or a stirring motion and the temperature of the mixture is brought to the level desired, for example at the rate of about 2° C. per minute, and maintained for a length of time sufficient to produce satisfactory yields of the desired product. Upon cooling, the reaction products are removed, the solvent distilled off and the product separated by fractional distillation or precipitation. The residue following distillation will contain the metal of the carbonyl used as catalyst which can be recovered and reheated with carbon monoxide to yield the carbonyl.

The following examples will serve to illustrate the invention but are not to be construed as limiting its scope in any way:

*Example 1*

Fifty-eight g. (1.0 mole) of 1,2-epoxypropane and 8 g. (0.023 mole) of dicobalt octacarbonyl are dissolved in 300 cc. of benzene and placed in a high pressure tubular autoclave fixed on a rocking assembly. The autoclave is sealed, flushed first with nitrogen, then with carbon monoxide and then charged with carbon monoxide at a pressure of 6,000 lbs. per sq. inch. Rocking was started and heat applied until a temperature of 160° C. was reached. The temperature was maintained for four hours. The autoclave was allowed to cool to room temperature, the pressure released and the reaction mixture extracted. The benzene was first distilled off at atmospheric pressure, then at a pressure of 3 mm., the products were distilled off, the crotonic acid coming off at 119–121° C. The crotonic acid recovered analyzed to a purity of 97.2% and represented a yield of 81% based upon the initial epoxypropane.

*Example 2*

A reaction mixture composed of 0.5 mole of 1,2-epoxypentane and 0.02 mole of dicobalt octacarbonyl in 500 cc. petroleum ether (B.P. 80°–100° C.) was placed in a high pressure tubular autoclave, fixed on a rocking assembly, sealed, flushed with nitrogen, carbon monoxide and finally charged with carbon monoxide to a pressure of 5,200 lbs. per sq. inch. Heat was applied at a rate of 2° C. per minute, rocking started and a temperature of 148° C. was reached and maintained for 16 hours. The reaction products were fractionally distilled at 90–92° C. under 5 mm. pressure, to recover 2-hexenoic acid which analyzed to a purity of 94.8% and represented a yield of 52%.

*Example 3*

A reaction mixture composed of 1.0 mole of 1,2-epoxyethane and 0.05 mole of dicobalt octacarbonyl in 500 cc. petroleum ether (B.P. 80°–100° C.) was placed in a high pressure tubular autoclave fixed on a rocking assembly, sealed, flushed with nitrogen, carbon monoxide and finally charged with carbon monoxide at a pressure of 4,000 lbs. per sq. inch. Heat was applied at a rate of 2° C. per minute, rocking started and a temperature of 140° C. was reached and maintained for 2 hours. The reaction products were fractionally distilled at 69–71° C. and 50 mm. and acrylic acid, which analyzed to a purity of 96.1% and represented a yield of 72% was recovered.

We claim:

1. A process for preparing alpha-beta unsaturated carboxylic acids which comprises reacting, in the absence of water, carbon monoxide with an aliphatic epoxy organic hydrocarbon compound having at least two carbon atoms and at least one epoxy linkage thereto in the presence of a metal carbonyl catalyst selected from the group consisting of cobalt, nickel, manganese, and chromium carbonyls, at a temperature between about 120° C. to about 250° C. and under superatmospheric pressure of from about 1,000 to about 10,000 pounds per square inch.

2. The process of claim 1 wherein the epoxy organic compound is 1,2-epoxyethane and the catalyst is dicobalt octacarbonyl forming acrylic acid.

3. The process of claim 1 wherein the organic compound is 1,2-epoxypropane and the catalyst is dicobalt octacarbonyl forming crotonic acid.

References Cited in the file of this patent
UNITED STATES PATENTS 2,782,226   Seon et al. _____ Feb. 19, 1957